United States Patent
Endo et al.

(10) Patent No.: US 9,290,177 B2
(45) Date of Patent: Mar. 22, 2016

(54) VEHICLE CONTROL APPARATUS

(71) Applicant: Fuji Jukogyo Kabushiki Kaisha, Tokyo (JP)

(72) Inventors: Hideaki Endo, Tokyo (JP); Naoya Kidokoro, Tokyo (JP); Hiroshi Numagami, Tokyo (JP); Koichi Mizutani, Tokyo (JP); Takemi Oguri, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/524,094

(22) Filed: Oct. 27, 2014

(65) Prior Publication Data
US 2015/0120086 A1   Apr. 30, 2015

(30) Foreign Application Priority Data

Oct. 30, 2013   (JP) .................................. 2013-225929
Oct. 30, 2013   (JP) .................................. 2013-225930
Aug. 28, 2014   (JP) .................................. 2014-174024

(51) Int. Cl.
*B60W 30/08* (2012.01)
*G08G 1/16* (2006.01)
*B60W 50/12* (2012.01)
*B60W 50/08* (2012.01)
*B60K 35/00* (2006.01)

(52) U.S. Cl.
CPC ................ *B60W 30/08* (2013.01); *B60K 35/00* (2013.01); *B60W 50/08* (2013.01); *B60W 50/12* (2013.01); *G08G 1/16* (2013.01); *B60K 2350/962* (2013.01); *B60K 2350/967* (2013.01); *B60W 2420/42* (2013.01); *B60W 2520/10* (2013.01)

(58) Field of Classification Search
CPC ......... B60W 30/08; B60W 50/12; G08G 1/16
See application file for complete search history.

(56) References Cited

U.S. PATENT DOCUMENTS

| | | | |
|---|---|---|---|
| 7,831,350 B2 * | 11/2010 | Goudy .............................. | 701/36 |
| 2004/0181334 A1 * | 9/2004 | Blumbergs et al. ............ | 701/200 |
| 2008/0255725 A1 * | 10/2008 | Geisler et al. .................... | 701/36 |
| 2011/0224897 A1 * | 9/2011 | Tan ................................. | 701/200 |
| 2014/0115507 A1 * | 4/2014 | Bailey et al. ................... | 715/764 |

FOREIGN PATENT DOCUMENTS

JP    H08-184449    7/1996

* cited by examiner

Primary Examiner — Michael J Zanelli
(74) Attorney, Agent, or Firm — Troutman Sanders LLP

(57) ABSTRACT

An equipment operation controller implements control to disable an operation of equipment that is operated inside a vehicle cabin and not perform functions of the equipment according to such the operation, when a vehicle is traveling at or above a prescribed speed. However, even when the vehicle is traveling at or above the prescribed speed, if a travel assistance unit implements a control for travel assistance and a determination unit determines to permit the operation of the equipment then the operation of the equipment is enabled. The determination unit determines whether or not to permit the operation of the equipment, based on a risk evaluated based on information on the outside of the vehicle acquired by an outside information acquisition unit, and a state of the vehicle, and determines to permit the operation of the equipment when the risk is equal to or lower than a prescribed level.

14 Claims, 11 Drawing Sheets

VEHICLE CONTROL APPARATUS

CROSS-REFERENCE TO RELATED APPLICATIONS

The present application claims priority from Japanese Patent Application Nos. 2013-225929 filed on Oct. 30, 2013, 2013-225930 filed on Oct. 30, 2013, and 2014-174024 filed on Aug. 28, 2014, the entire contents of which are hereby incorporated by reference.

BACKGROUND

1. Technical Field

The present invention relates to a vehicle control apparatus for improving the safety while a vehicle is traveling.

2. Related Art

In recent years, vehicles have come to provide functions aimed at operations other than driving. For instance, various vehicle-mounted equipment, such as a car navigation system and an audio device, is installed at the driver seat of a vehicle. In order to operate the vehicle-mounted equipment while traveling, the driver moves his or her line of sight from the direction of travel of the vehicle to the equipment in question. Therefore, in order to guarantee safety while the vehicle is traveling, technology has been proposed which makes it impossible to perform an input operation to the navigation system and the like, while the vehicle is traveling. However, if it is completely impossible to carry out an input operation to the car navigation system and the like, then there is a problem in that the driver cannot change the destination or route while traveling, and hence convenience is impaired.

Therefore, technology has been developed which enables a driver to carry out input operations to equipment during travel, while ensuring safety during travel. For instance, Japanese Unexamined Patent Application Publication No. H8-184449 discloses technology which disables operation of the display of a car navigation apparatus by the driver while the vehicle is traveling. In other words, a detector which detects whether or not the vehicle is traveling and a detection sensor which detects an operation by the driver and an operation by a fellow passenger, are provided. If the vehicle is not traveling, then operation of the display is enabled, whereas if the vehicle is traveling, then operation is disabled if the operator of the display is the driver, and operation is enabled if the operation of the display is the fellow passenger.

In this way, by enabling operation even during travel, if the operation is performed by a person other than the driver, then it is possible to reduce inconvenience while ensuring safety. However, if there is no fellow passenger, for example, then it remains impossible to perform an input operation to the car navigation system, or the like, while the vehicle is traveling. Furthermore, since it is necessary to determine whether the operator is the driver or a fellow passenger, then a complex mechanism is required. Moreover, if the detector identifies the operator incorrectly, then safety cannot be ensured.

SUMMARY OF THE INVENTION

The present invention has been designed in consideration of the circumstances described above, and it is an object of the present invention to provide a vehicle control apparatus capable of achieving both safety and convenience of use of vehicle-mounted equipment.

An aspect of the present invention provides a vehicle control apparatus including: an outside information acquisition unit which acquires information on the outside of a vehicle; a determination unit which determines whether to permit operation of equipment that is operated inside a vehicle cabin, on the basis of the information acquired by the outside information acquisition unit; a travel assistance unit which assists travel of the vehicle at least one of directly and by a notification such as a warning, on the basis of the information acquired by the outside information acquisition unit; and an equipment operation controller which enables operation of the equipment while the vehicle is traveling, during assistance by the travel assistance unit, when the determination unit has determined to permit operation of the equipment.

The determination unit may determine whether to prohibit operation of equipment that is operated inside the vehicle cabin, on the basis of the information acquired by the outside information acquisition unit; and the equipment operation controller may disable operation of the equipment while the vehicle is traveling, even during assistance by the travel assistance unit, when the determination unit has determined to prohibit operation of the equipment.

DETAILED DESCRIPTION

Implementations of this invention are described below with reference to the drawings.

[First Implementation]

Figure 1:
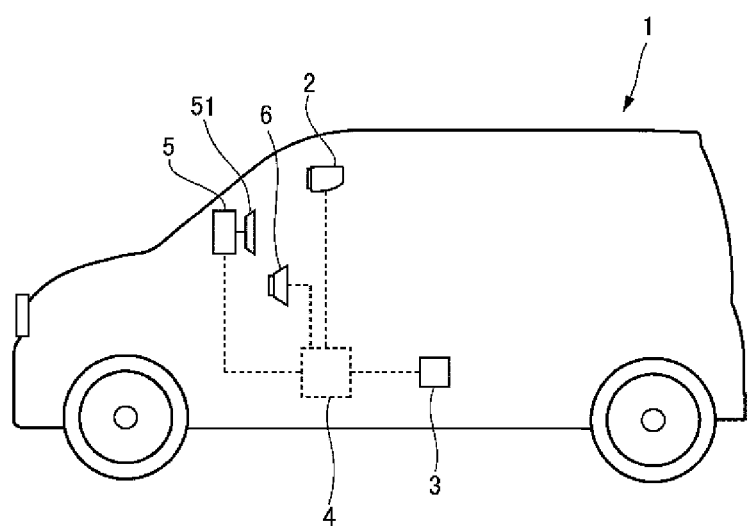
FIG. 1 is a general schematic drawing of a vehicle relating to a first implementation of the present invention.

As illustrated in FIG. 1, a vehicle 1 provided with the vehicle control apparatus relating to a first implementation of the present invention includes: an imaging device 2 which acquires information on the outside of the vehicle 1, a vehicle state detection device 3 which detects a speed of travel of the vehicle 1, a controller 4 which controls the vehicle 1 on the basis of outside circumstances outside the vehicle 1 and the state of the vehicle 1, a car navigation system 5 provided at the driver seat of the vehicle 1, and a warning device 6 which outputs a warning in the form of a display, sound, vibration, or the like, to the driver in the driver seat.

The imaging device 2, which is an outside information acquisition unit, includes two front cameras provided at the front of the vehicle 1, and acquires image data by capturing images of the outside of the vehicle 1 at prescribed time intervals (for example, every 4 milliseconds). In the present implementation, the imaging device 2 is disposed inside the vehicle near the front windscreen of the vehicle 1 and captures images in the forward direction of the vehicle 1, but the invention is not limited to this and a camera which captures images in a lateral direction or rearward direction of the vehicle 1 may also be provided.

The vehicle state detection device 3 detects the speed of travel of the vehicle 1, the moment acting on the vehicle 1 and/or the steering angle of the vehicle 1, and acquires vehicle speed data corresponding to the detected speed of travel, moment data corresponding to the detected moment and steering angle data corresponding to the detected steering angle.

Figure 2:
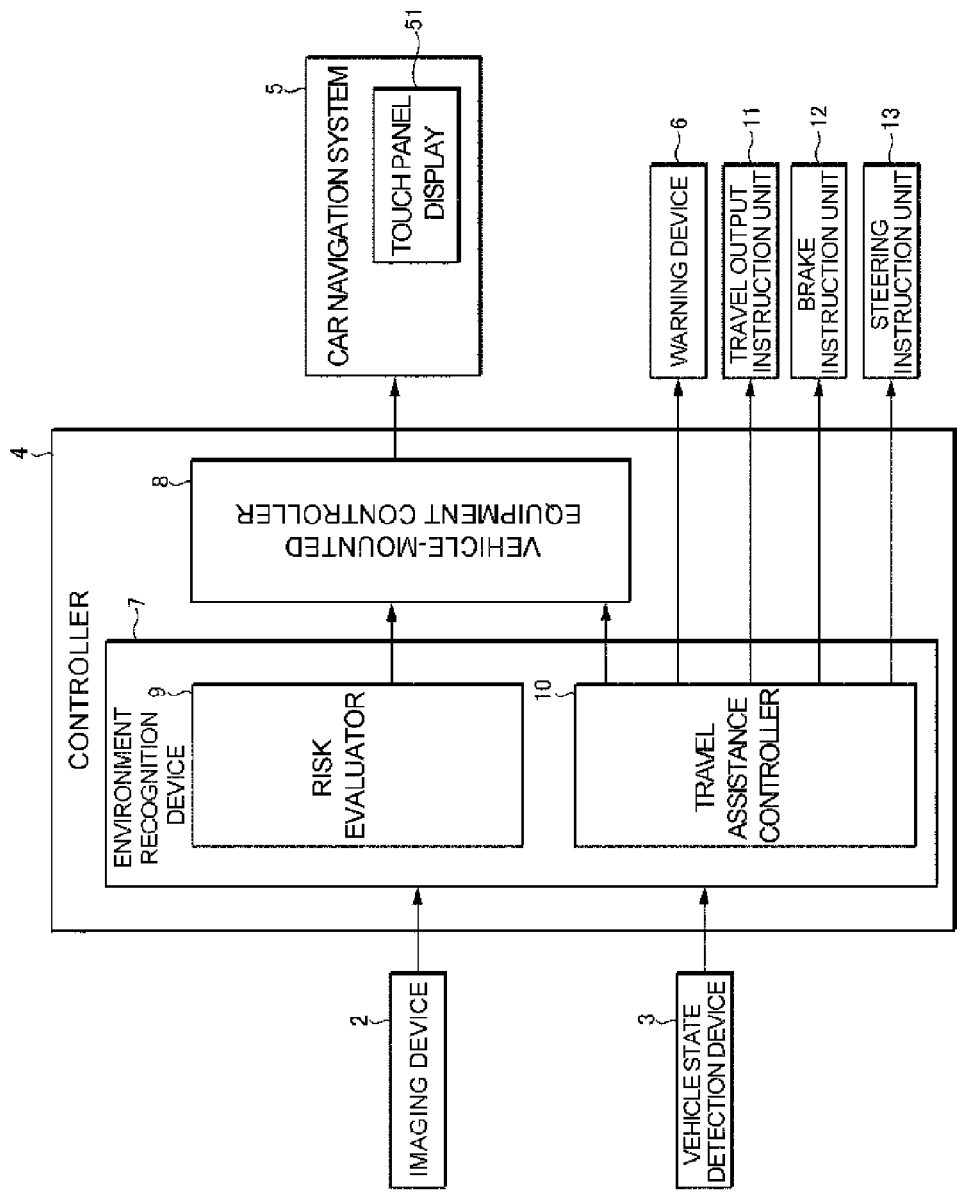
FIG. 2 is a block diagram illustrating input and output of control signals in the vehicle control apparatus.

The controller 4 is a CPU or ECU, for instance, and as illustrated in FIG. 2, includes an environment recognition device 7 which carries out processing for recognizing the environment of the vehicle 1 on the basis of the information acquired by the imaging device 2 and the vehicle state detection device 3, and a vehicle-mounted equipment control device 8 which controls the vehicle-mounted equipment in the vehicle 1. The environment recognition device 7 has a risk evaluator 9 which evaluates the risk to the vehicle 1, and a travel assistance controller 10 which controls travel assistance and warnings relating to the travel of the vehicle 1.

The risk evaluator 9, which is a determination unit, evaluates the risk to the vehicle 1 on the basis of the image data acquired by the imaging device 2, and the moment data and steering angle data acquired by the vehicle state detection device 3. In the present implementation, the risk evaluator 9 determines the presence or absence of preceding vehicles, pedestrians or obstacles situated in the direction of travel of the vehicle 1, the distance from the vehicle 1 to the obstacle, the direction of travel of the vehicle 1 with respect to the traffic lane and the like, on the basis of the image data acquired by the imaging device 2. Furthermore, the risk evaluator 9 also determines a type of moment, such as yaw, pitch or roll, acting on the vehicle 1, and the magnitude of the moment, on the basis of the moment data acquired by the vehicle state detection device 3, as well as determining the steering angle of the vehicle 1, on the basis of the steering angle data, the magnitude of the moment, or a combination of these. Then, the risk evaluator 9 comprehensively analyzes the environment of the vehicle 1 recognized on the basis of the various information thus determined to evaluate the risk, and determines whether or not to permit operation of the vehicle-mounted equipment, such as the car navigation system 5, on the basis of this evaluation result.

For instance, the risk evaluator 9 calculates the relative position between the vehicle 1 and the obstacle, such as a preceding vehicle, pedestrian and obstacle, on the basis of the image data, moment data, steering angle data, elapsed time, etc., or a combination of these, and evaluates whether or not the risk has increased. If it is estimated that there is no object in the direction of travel of the vehicle 1 or the distance from the vehicle 1 to the object is large, in the direction of travel of the vehicle 1 which is estimated from the moment data and the steering angle data, etc., then it is determined that the risk has not increased. If it is estimated that the risk has not increased, then it is determined to permit operation of the vehicle-mounted equipment. On the other hand, if it is estimated that an obstacle is present in a near-distance range from the vehicle 1 in the direction of travel of the vehicle 1, or that the vehicle 1 is approaching the obstacle, then it is evaluated that the risk has increased. If it is estimated that the risk has increased, then it is determined not to permit operation of the vehicle-mounted equipment.

The risk evaluator 9 may determine whether or not to permit operation of the vehicle-mounted equipment, depending on whether or not the integrated value of respective risks is equal to or greater than a prescribed value. More specifically, a risk value calculated from the image data, a risk value calculated from the moment data, and a risk value calculated from the steering angle data and the like, are integrated. It is determined that the operation of the vehicle-mounted equipment is permitted if the integrated value of the risk values is equal to or less than a prescribed value, and it is determined that the operation of the vehicle-mounted equipment is not permitted, if the integrated value is greater than the prescribed value. For instance, if it is evaluated that there is no preceding vehicle, pedestrian or obstacle in the direction of travel of the vehicle 1, then the risk value becomes lower. Furthermore, if it is evaluated that a preceding vehicle is traveling in the direction of travel of the vehicle 1, then the risk value becomes higher, the shorter the distance from the vehicle 1 to the preceding vehicle. Moreover, the risk value becomes lower, the weaker the moment acting on the vehicle 1, and the risk value becomes lower, the nearer the steering angle to straight ahead of the vehicle 1. Consequently, for example, even if the distance from the vehicle 1 to the preceding vehicle is not short, the integrated value of the risk becomes high when the moment acting on the vehicle 1 is strong, and hence it is determined not to permit the operation of the vehicle-mounted equipment. The individual risks may also include the risk of injury to an occupant, based on the sitting position and attitude, etc., of the occupant, and so on.

In this case, even if the individual risk values are calculated, the risk evaluator 9 does not have to determine whether or not to permit operation of the vehicle-mounted equipment on the basis of the integrated value of the individual risks, but rather may determine to permit operation of the vehicle-mounted equipment on condition that all of the risk values are equal to or lower than a prescribed value, and determine not to permit operation of the vehicle-mounted equipment if any one of the risk values is equal to or greater than the prescribed value. Furthermore, the risk evaluator 9 may also determine whether or not to permit operation of the vehicle-mounted equipment depending on whether or not the maximum value of the individual risk values, rather than the integrated value of the individual risks, is equal to or lower than a prescribed value.

Furthermore, the risk evaluator 9 may determine the circumstances of the vehicle 1 on the basis of only the image data acquired by the imaging device 2, or may determine the circumstances of the vehicle 1 on the basis of only the moment data and/or the steering angle data acquired by the vehicle state detection device 3. Moreover, in addition to the image data and/or the moment data, etc., the circumstances of the vehicle 1 may also be determined on the basis of the vehicle speed data acquired by the vehicle state detection device 3.

Furthermore, the risk evaluator 9 may set up a risk map indicating the distribution of the risk potential of the vehicle 1 on the basis of the image data acquired by the imaging device 2, and may determine whether or not to permit operation of the vehicle-mounted equipment on the basis of the set risk map. In this case, for example, a plurality of risk potential distributions based on the type of road and the type of obstacle, etc. situated about the periphery of the vehicle 1 are generated on the basis of image data, and a risk map is created by synthesizing these risk potentials. The risk is then evaluated on the basis of the created risk map, depending on whether or not the distribution of risk potentials has increased relatively, and whether or not the vehicle 1 is close to the risk potential. The risk evaluator 9 determines to permit operation of the vehicle-mounted equipment if it is evaluated that the distribution of risk potentials has not increased relatively and the risk potential is not close to the vehicle 1. On the other hand, the risk evaluator 9 determines not to permit operation of the vehicle-mounted equipment if it is evaluated that the distribution of risk potentials has increased relatively or if it is evaluated that the vehicle 1 is close to a risk potential.

Furthermore, the risk evaluator 9 may obtain a risk distribution on the basis of a characteristic amount of the image data acquired by the imaging device 2, and evaluate the risk to the vehicle 1 on the basis of this risk distribution. Here, the risk determined from the characteristic amount of the image data is, for instance, higher when an object in the periphery of the vehicle 1 detected by the image data is a vehicle rather than road infrastructure, and is even higher when the object is a pedestrian, rather than a vehicle. A risk distribution representing the level of risk is represented by contour lines. The risk evaluator 9 refers to the risk distribution and determines to permit operation of the vehicle-mounted equipment if it is evaluated, on the basis of the state of the vehicle 1 and the like, that the peaks of the contour lines are not high and the vehicle 1 is not close to a peak of the contour lines. On the other hand, if it is determined that the peak of the contour lines is high, or that the vehicle is close to the peak of a contour line, then it is determined not to permit operation of the vehicle-mounted equipment.

Moreover, the risk evaluator 9 may determine the risk to the vehicle 1 by estimating the inner state of the driver. In this case, for example, the risk evaluator 9 creates a model parameter by learning from the image data acquired by the imaging device 2 and the driving operation data for the driver. This model parameter is used to acquire a relationship between the risk level of the travel environment and an operation characteristic amount of the driver, and to estimate the current inner state of the driver. The estimated inner state of the driver and the travel environment risk are compared to evaluate the risk to the vehicle 1. If it is determined that the vehicle 1 is in a substantially safe state and is not approaching a dangerous state, then it is determined to permit operation of the vehicle-mounted equipment. On the other hand, if it is determined that the vehicle 1 is in a substantially dangerous state or approaching a dangerous state, then it is determined not to permit operation of the vehicle-mounted equipment.

In this way, the risk evaluator 9 of the environment recognition device 7 evaluates the risk to the vehicle 1 by converting the risk into a parameter by calculation based on the recognized environment of the vehicle 1, assessing the risk potential, and creating a risk map, and determines whether or not the recognized environment of the vehicle 1 satisfies prescribed conditions.

The travel assistance controller 10 controls assistance of the travel of the vehicle 1 and warnings relating to travel, by analyzing various data input from the imaging device 2 or the vehicle state detection device 3. In other words, the travel assistance controller 10 adjusts the drive amount, braking amount, and steering amount of the vehicle 1 in accordance with the outside circumstances of the vehicle 1, the speed of travel of the vehicle 1 and the like, and provides assistance for making the travel of the vehicle 1 comfortable. Furthermore, a warning for prompting the driver to decelerate the vehicle 1, or the like, is issued in accordance with the outside circumstances of the vehicle 1. The travel assistance controller 10 is started up with the switching on of an ignition device of the engine of the vehicle 1 or a motor control starter acting as a prime mover, for instance, an ignition switch (not illustrated), which is the switch of the starter device of an electric motor, or is started up at a time set on the basis of a signal from same, and implements travel assistance for the vehicle 1 at all times when the switch is in an started state.

The control of travel assistance for the vehicle 1 which is implemented by the travel assistance controller 10 recognizes the environment of the vehicle 1 and implements control for assisting travel of the vehicle 1 on the basis of the recognized environment. In the present implementation, the travel assistance controller 10 calculates the risk to the vehicle 1 from various data input from the imaging device 2 and the vehicle state detection device 3, and implements control to adjust the drive amount and/or the braking amount, and the steering amount, of the vehicle 1, so as to avoid or reduce the calculated risk.

The method of controlling the travel assistance is not limited to the method described above. For instance, the travel assistance controller 10 calculates collision conditions of the vehicle 1 with an obstacle, or the like, and adjusts the drive amount and/or the braking amount, and the steering amount of the vehicle 1, in order to avoid collision of the vehicle 1 with the obstacle, or the like, and to diminish collision damage. In this case, for example, the relative position of the vehicle 1 and the obstacle, or the like, is calculated on the basis of image data. The collision conditions with an obstacle, or the like, if the vehicle 1 travels at the current speed of travel and steering angle, are calculated, and the risks relating to the collision position, the physical constitution and posture of occupants and the like, are calculated and summed. If it is possible to avoid a collision, from the calculated collision conditions, then a warning is issued by a notification unit, for example, the warning device 6, to the user, and travel assistance is also controlled in order to avoid a collision. The notification unit may use a visual display or a mechanical movement, such as a vibration. Furthermore, if a collision of the vehicle 1 with an obstacle, or the like, is unavoidable, then travel assistance is controlled in order to minimize the summed risks to the occupants.

Furthermore, the travel assistance controller 10 may set up a risk map indicating the distribution of the risk potential of the vehicle 1 on the basis of the image data acquired by the imaging device 2, and may set a target travel route for the vehicle 1 on the basis of the set risk map. In this case, for example, a plurality of risk potential distributions based on the type of road and the type of obstacle, etc. situated about the periphery of the vehicle 1 are generated on the basis of image data, and a risk map is created by synthesizing these risk potentials. A target travel route which avoids a region where a high risk potential is distributed is set on the basis of the created risk map, and travel assistance is controlled rationally in accordance with the target travel route.

Furthermore, the travel assistance controller 10 may control travel assistance for the vehicle 1 by risk recognition and risk minimization trajectory planning. In this case, the travel assistance controller 10 recognizes the risk on the basis of the characteristic amount of the image data acquired by the imaging device 2. This risk is, for instance, higher when an object in the periphery of the vehicle 1 detected from the image data is a vehicle rather than road infrastructure, and is even higher when the object is a pedestrian, rather than a vehicle. When a risk is recognized, the distribution circumstances of the recognized risk are represented in the form of contours, and the trajectory that is to be traveled by the vehicle 1 is planned in such a manner that the vehicle 1 avoids places where the contours are high and travels in places where the risk is lowest. Control is then implemented to control the drive amount, braking amount and steering amount of the vehicle 1, in such a manner that the position of the vehicle 1 coincides with the planned trajectory.

In this way, the travel assistance controller 10 implements control to assist travel by adjusting the drive amount and/or braking amount, steering amount and the like, of the vehicle 1, and/or issuing warnings, in accordance with the outside circumstances of the vehicle 1 and the state of the vehicle 1.

The risk evaluator 9 and the travel assistance controller 10 both implement control on the basis of the risk relating to the vehicle 1, and the risk determined by the risk evaluator 9 and the risk used by the travel assistance controller 10 may be the same or different. Desirably, the risk evaluator 9 determines, predictively, the risk which may occur during operation of the vehicle-mounted equipment by an occupant, and the travel assistance controller 10 determines the actually occurring risk relating to the vehicle 1 which is to be avoided. For example, if the distance between the vehicle 1 and the object is 100 m, then the risk evaluator 9 may consider that the risk is equal to or less than the prescribed level and determine to permit operation of the vehicle-mounted equipment, whereas the travel assistance controller 10 may consider that the obstacle is a risk that is to be avoided and implement control to adjust the drive amount and/or steering amount of the vehicle 1. Furthermore, if the vehicle 1 is reversing and there is no obstacle in the direction of rearward travel, then the risk evaluator 9 may consider that the risk is equal to or greater than the prescribed level and determine not to permit operation of the vehicle-mounted equipment, whereas the travel assistance controller 10 may determine that there is no risk to be avoided.

In the present implementation, the risk evaluator 9 and the travel assistance controller 10 constitute the environment recognition device 7 of the controller 4, but the invention is not limited to this and the risk evaluator 9 and the travel assistance controller 10 may be provided as respectively independent control devices. In this case, the risk evaluator 9 and the travel assistance controller 10 input data directly from the imaging device 2 or the vehicle state detection device 3, to determine the risk relating to the vehicle 1 and control the travel assistance.

The car navigation system 5 is vehicle-mounted equipment which is located at the driver seat of the vehicle 1, and has a touch panel display 51. The touch panel display 51 has a function for displaying map information and the like, as well as a function for receiving operations performed by the driver. The driver is able to call up map information, recognize a route, and so on, by operating the touch panel display 51.

The vehicle-mounted equipment controller 8, which is an equipment operation control unit, sets operation of the car navigation system 5 to be invalid, except for when prescribed conditions are established. In other words, during travel of the vehicle 1, even if an operation of the car navigation system 5 is performed, the car navigation system 5 does not function in accordance with this operation. It is also possible to implement control such that actual operation of the car navigation system 5 is not possible while the vehicle is traveling.

The warning device 6 is a speaker provided at the driver seat of the vehicle 1, which outputs a warning sound or voice announcement into the vehicle cabin. The warning device 6 may be combined with the car navigation system 5. More specifically, the car navigation system 5 may be configured so as to issue a warning noise or voice announcement, and a warning display. Furthermore, a notification sound which notifies pedestrians and the like, outside the vehicle of the approach of the vehicle 1 may also be output externally, rather than inside the vehicle cabin.

FIG. 2 is a block diagram illustrating a portion of the composition of the vehicle control apparatus of the vehicle 1. As illustrated in FIG. 2, the imaging device 2 and the vehicle state detection device 3 are connected to the input side of the environment recognition device 7. Therefore, image data acquired by the imaging device 2, the vehicle speed data, moment data and steering angle data and the like, acquired by the vehicle state detection device 3 is input to the environment recognition device 7. On the other hand, a vehicle-mounted equipment control device 8 is connected to the output side of the risk evaluator 9 of the environment recognition device 7. Furthermore, the warning device 6, a travel output instruction unit 11 which implements control to adjust the drive amount for travel of the vehicle 1, a brake instruction unit 12 which implements control to adjust the brake device of the vehicle 1, and a steering instruction unit 13 which adjusts the steering amount of the vehicle 1, are connected to the output side of the travel assistance controller 10 of the environment recognition device 7. Consequently, instruction data is output from the risk evaluator 9 to the vehicle-mounted equipment controller 8, and respective control signals are output to the warning device 6, the travel output instruction unit 11, the brake instruction unit 12, and the steering instruction unit 13, from the travel assistance controller 10.

The car navigation system 5 is connected to the output side of the vehicle-mounted equipment control device 8. Consequently, a signal can be output from the vehicle-mounted equipment control device 8 to the car navigation system 5.

In the present implementation, the vehicle-mounted equipment control device 8 is capable of outputting signals to the car navigation system 5, but the invention is not limited to this, and the vehicle-mounted equipment control device 8 may be capable of outputting signals to other vehicle-mounted equipment, such as audio equipment or the air-conditioning unit, for purposes other than a driving operation for travel of the vehicle. Furthermore, the image data acquired by the imaging device 2, the vehicle speed data acquired by the vehicle state detection device 3, and the like, may be output directly to the vehicle-mounted equipment controller 8 without passing via the environment recognition device 7.

The travel output instruction unit 11 outputs a signal instructing acceleration or deceleration of the vehicle 1, to a drive control device (not illustrated) which controls the drive power source of the vehicle 1. The drive control device is capable of increasing or decreasing the drive amount of the vehicle 1, regardless of the operation of the accelerator, in accordance with an instruction from the travel output instruction unit 11.

The brake instruction unit 12 outputs a signal instructing operation of the brakes, to a brake control device (not illustrated) which implements control to operate the brake device of the vehicle 1, in accordance with a brake operation performed by the driver. The brake control device is capable of implementing control to operate the brake device of the vehicle 1 and to adjust the magnitude of braking, regardless of whether or not there is a brake operation, in accordance with an instruction from the brake instruction unit 12.

The steering instruction unit 13 outputs a signal instructing a steering amount of a steering device, to a steering control device (not illustrated) which implements control to operate the steering device of the vehicle 1, in accordance with operation of the steering wheel performed by the driver. The steering control device is able to change the steering amount of the steering device of the vehicle 1, regardless of the operation of the steering wheel, in accordance with an instruction from the steering instruction unit 13.

Figure 3:
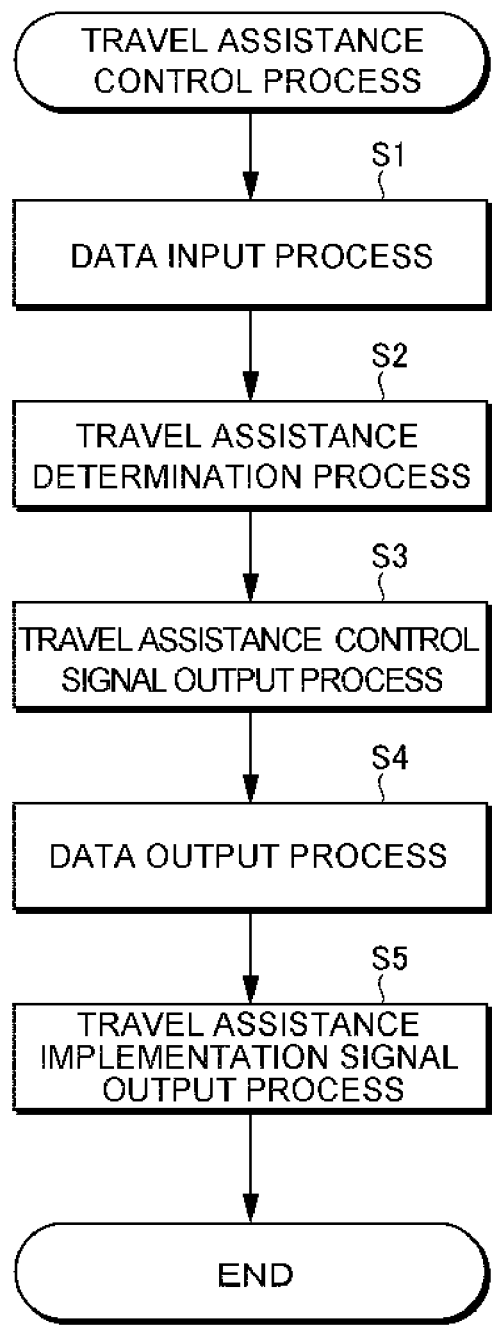
FIG. 3 is a diagram illustrating a travel assistance control process.

Next, a travel assistance control process for implementing travel assistance and travel-related warnings for the vehicle 1 on the basis of the environment recognition device 7 will be described with reference to FIG. 3. The processing flow illustrated in FIG. 3 is executed at prescribed intervals apart (every 4 milliseconds, for example).

Firstly, in step S1, the environment recognition device 7 inputs the image data acquired by the imaging device 2 and the vehicle speed data, moment data and steering angle data acquired by the vehicle state detection device 3.

In step S2, the travel assistance controller 10 of the environment recognition device 7 determines what kind of travel assistance to implement, on the basis of the image data, vehicle speed data, moment data and steering angle data input in step S1. For example, when the vehicle speed is faster than a prescribed speed, the travel assistance controller 10 determines to provide assistance so as to lower the vehicle speed by adjusting the drive amount of the vehicle 1. Furthermore, when a large moment is acting on the vehicle 1, or the steering angle is such that the vehicle 1 is predicted to leave the traffic lane in which it is traveling, then the travel assistance controller 10 determines to implement assistance so as to change the steering amount of the steering device. Moreover, when there is a pedestrian in front of the vehicle 1, then the travel assistance controller 10 determines to operate the brake device and also to provide assistance by warning the driver. In other words, the travel assistance controller 10 acquires the travel circumstances of the vehicle 1 on the basis of the environment recognized from the outside circumstances of the vehicle 1 and the state of the vehicle 1, and determines to implement assistance to make the travel of the vehicle 1 more comfortable and safer, in accordance with the travel circumstances.

In step S3, the travel assistance controller 10 of the environment recognition device 7 outputs control signals based on the travel assistance method determined in step S2, to the warning device 6, the travel output instruction unit 11, the brake instruction unit 12, and the steering instruction unit 13. The warning device 6 which has received a control signal when a warning has been issued outputs a warning sound and voice announcement into the cabin. Furthermore, the travel output instruction unit 11 outputs an instruction signal in accordance with the input control signal, to the drive control device. Moreover, the brake instruction unit 12 outputs an instruction signal in accordance with the input control signal, to the brake control device. Furthermore, the steering instruction unit 13 outputs an instruction signal in accordance with the input control signal, to the steering control device.

In step S4, the travel assistance controller 10 of the environment recognition device 7 outputs the vehicle speed data input in step S1, to the vehicle-mounted equipment control device 8.

In step S5, the travel assistance controller 10 of the environment recognition device 7 outputs a travel assistance implementation signal indicating that travel assistance has been implemented, to the vehicle-mounted equipment control device 8. Consequently, the vehicle-mounted equipment control device 8 can ascertain that travel assistance is being implemented in the vehicle 1. When the processing in this step has been completed, the travel assistance control process terminates.

Figure 4:
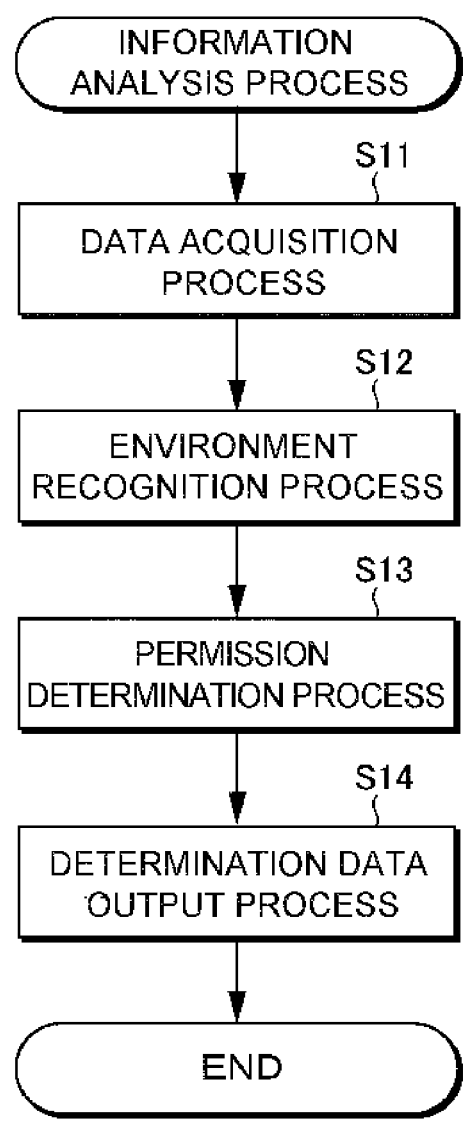
FIG. 4 is a diagram illustrating an information analysis process.

Next, an information analysis process carried out by the environment recognition device 7 to recognize the environment of the vehicle 1 on the basis of the outside circumstances of the vehicle 1 and the state of the vehicle 1, and to determine whether or not to permit operation of the vehicle-mounted equipment on the basis of the recognized environment of the vehicle 1, will be described with reference to FIG. 4. The processing flow illustrated in FIG. 4 is executed at prescribed intervals apart (every 4 milliseconds, for example).

Firstly, in step S11, the environment recognition device 7 inputs the image data acquired by the imaging device 2 and the moment data and steering angle data acquired by the vehicle state detection device 3.

In step S12, the environment recognition device 7 recognizes the environment of the vehicle 1 on the basis of the image data, the moment data and the steering angle data input in step S11. More specifically, the environment recognition device 7 recognizes the environment of the vehicle 1, on the basis of whether or not there is an obstacle, or the like, present in the direction of travel of the vehicle 1, the distance from the vehicle 1 to the obstacle, and the moment acting on the vehicle 1 and the steering angle of the vehicle 1.

In step S13, the risk evaluator 9 of the environment recognition device 7 determines whether or not to permit operation of the vehicle-mounted equipment, on the basis of the environment of the vehicle 1 recognized in step S12. In other words, the risk evaluator 9 determines to permit operation of the vehicle-mounted equipment, when the environment of the vehicle 1 satisfies prescribed conditions, and determines not to permit operation of the vehicle-mounted equipment, when the environment of the vehicle 1 does not satisfy prescribed conditions. For example, if there is no other vehicle, pedestrian, obstacle, or the like, situated outside the vehicle 1, then it is readily determined that the environment of the vehicle 1 satisfies the prescribed conditions. Furthermore, if there is another vehicle, pedestrian, obstacle, or the like, present outside the vehicle 1, then it can be more readily determined that the environment of the vehicle 1 does not satisfy the prescribed conditions, the shorter the distance to the vehicle 1 from the other vehicle, pedestrian or obstacle, or the like. Moreover, when a large moment is acting on the vehicle 1 or the steering angle of the vehicle 1 indicates turning, then it can be determined readily that the environment of the vehicle 1 does not satisfy the prescribed conditions.

In step S14, the risk evaluator 9 of the environment recognition device 7 outputs determination data corresponding to the determination result in step S13, to the vehicle-mounted equipment control device 8. When this processing is completed, the information analysis process terminates.

Figure 5:
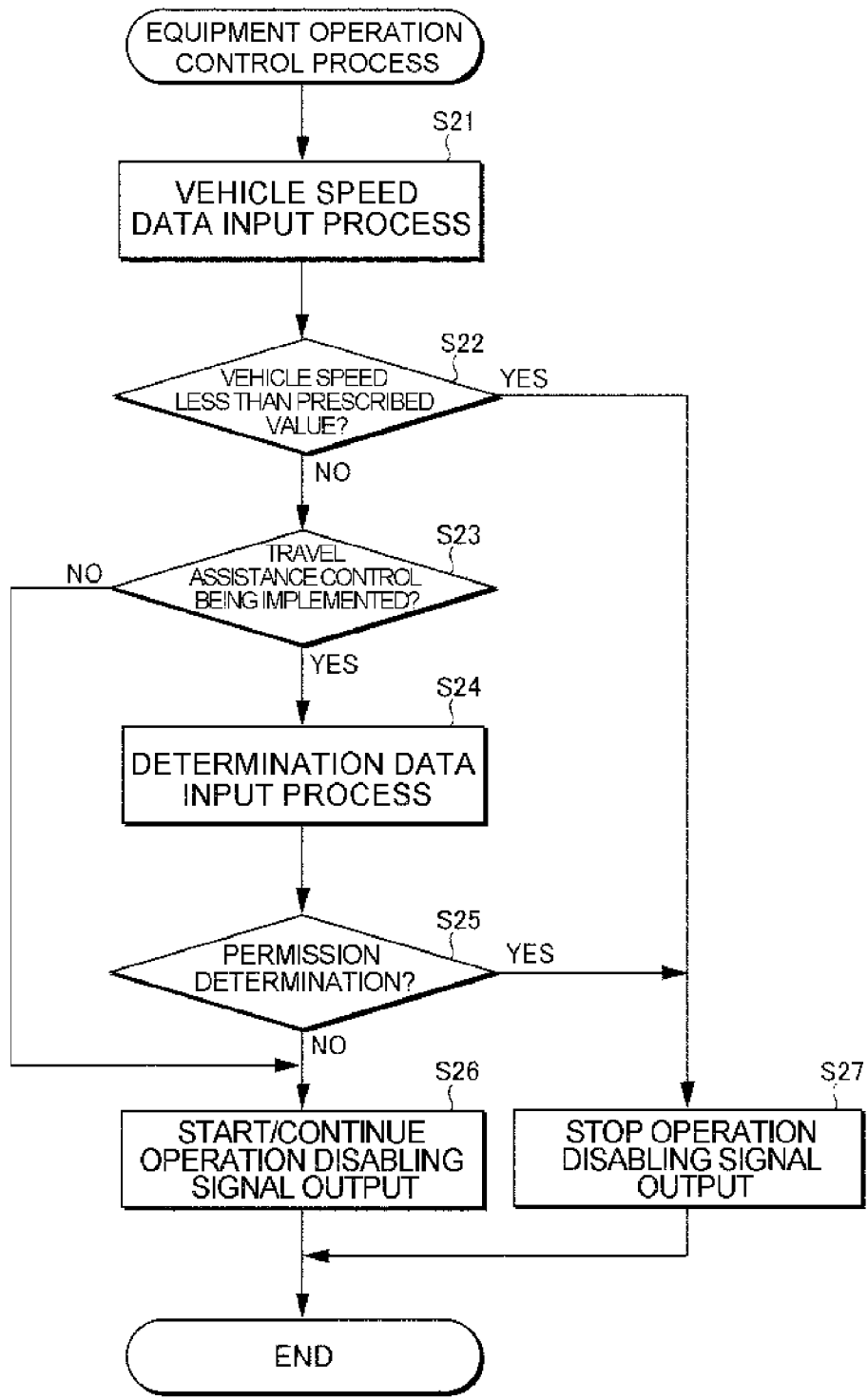
FIG. 5 is a diagram illustrating an equipment operation control process.

Next, the process of controlling operation of the car navigation system 5 by the vehicle-mounted equipment control device 8 will be described with reference to FIG. 5. The processing flow illustrated in FIG. 5 is executed at prescribed intervals apart (every 4 milliseconds, for example).

The vehicle-mounted equipment control device 8 controls the output of an operation disabling signal to the car navigation system 5. In principle, the vehicle-mounted equipment control device 8 outputs an operation disabling signal to the car navigation system 5 at all times, in step S26 described below.

Firstly, in step S21, the vehicle-mounted equipment control device 8 inputs vehicle speed data from the travel assistance controller 10. Here, the vehicle-mounted equipment controller 8 may input vehicle speed data directly from the vehicle state detection device 3.

In step S22, the vehicle-mounted equipment control device 8 determines whether or not the speed of the vehicle 1 is equal to or lower than a prescribed value. More specifically, the vehicle-mounted equipment control device 8 analyzes the vehicle speed data input in step S21, and determines whether or not the vehicle 1 is stationary or is traveling at less than a prescribed speed, for example, 10 km/h. If the speed of the vehicle 1 is less than 10 km/h, then the procedure transfers to step S27, and if the speed is equal to or greater than 10 km/h, then the procedure transfer to step S23.

In step S23, the vehicle-mounted equipment control device 8 determines whether or not the travel assistance controller 10 is implementing control to assist the travel of the vehicle 1. More specifically, the vehicle-mounted equipment control device 8 recognizes whether or not a travel assistance implementation signal has been input from the travel assistance controller 10, and determines that the travel assistance controller 10 is assisting the travel of the vehicle 1 when the travel assistance implementation signal has been input. A case where the travel assistance controller 10 is not implementing control to assist the travel of the vehicle 1 means, for example, a case where the travel assistance controller 10 is not operating due to a problem of some kind, or a case where the travel assistance by the travel assistance controller 10 has been stopped by an operation performed by the driver. If the travel assistance controller 10 is implementing control to assist the travel of the vehicle 1, then the procedure transfers to step S24, and if the travel assistance controller 10 is not implementing control to assist the travel of the vehicle 1, then the procedure transfers to step S26.

In step S24, the vehicle-mounted equipment control device 8 inputs determination data from the risk evaluator 9 of the environment recognition device 7. Consequently, the vehicle-mounted equipment control device 8 acquires the determination result data obtained as a result of the risk evaluator 9 of the environment recognition device 7 determining whether or not to permit operation of the vehicle-mounted equipment, in the step 13.

In step S25, the vehicle-mounted equipment control device 8 analyzes the determination data acquired in step S24 and determines whether or not the determination result from the risk evaluator 9 permits operation of the vehicle-mounted equipment. If the determination result from the risk evaluator 9 permits operation of the vehicle-mounted equipment, the procedure advances to S27, and if the determination result from the risk evaluator 9 does not permit operation of the vehicle-mounted equipment, then the procedure advances to step S26.

In step S26, the vehicle-mounted equipment control device 8 starts or continues the output of an operation disabling signal to the car navigation system 5. Consequently, the output of an operation disabling signal from the vehicle-mounted equipment control device 8 to the car navigation system 5 is started, and if the operation disabling signal is already being output, then the output of the operation disabling signal is continued. When the processing in this step has been completed, the equipment operation control process terminates.

In step S27, the vehicle-mounted equipment control device 8 stops the output of the operation disabling signal to the car navigation system 5. Consequently, the operation disabling signal ceases to be output from the vehicle-mounted equipment control device 8 to the car navigation system 5. When the processing in this step has been completed, the equipment operation control process terminates.

Figure 6:
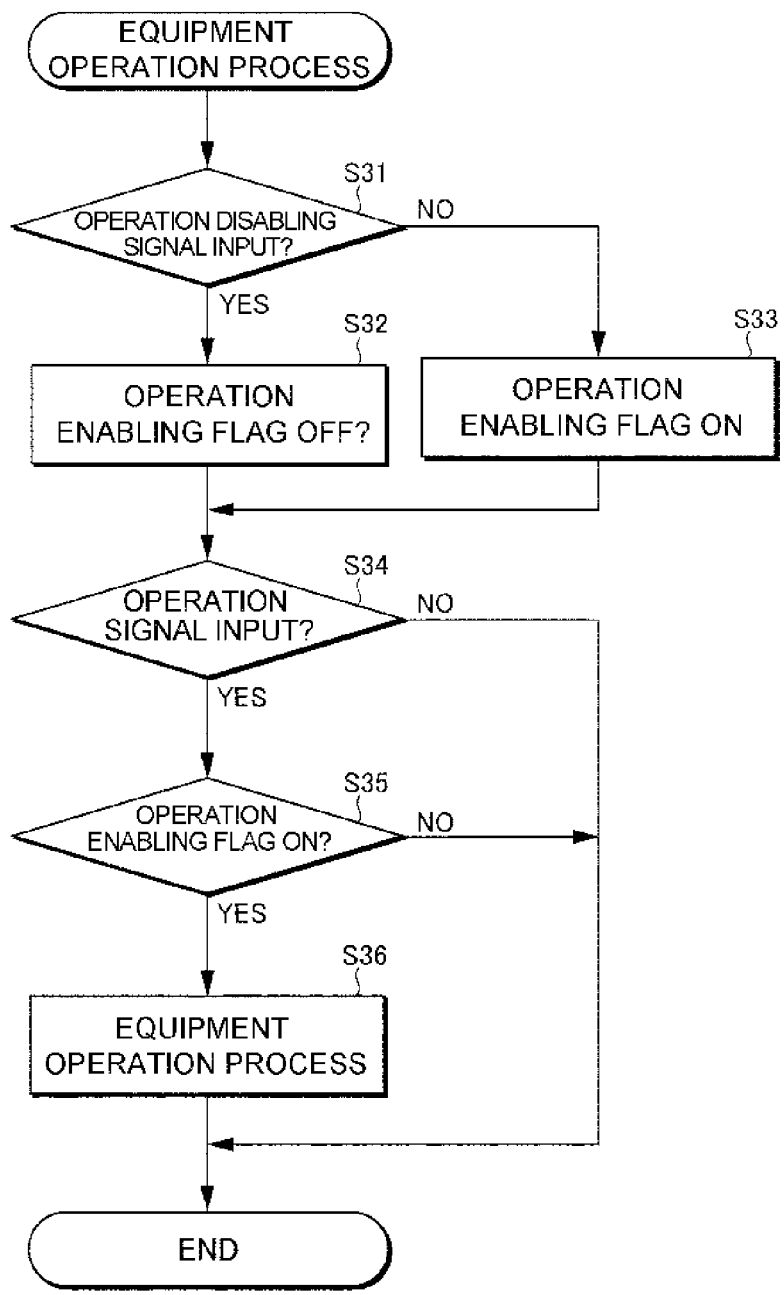
FIG. 6 is a diagram illustrating an equipment operation process.

Next, the equipment operation process for the car navigation system 5 will be described with reference to FIG. 6. The processing flow illustrated in FIG. 6 is executed at prescribed intervals apart (every 4 milliseconds, for example).

Firstly, in step S31, the car navigation system 5 determines whether or not an operation disabling signal has been input from the vehicle-mounted equipment control device 8. If the operation disabling signal has been input, then the procedure transfers to step S32, and if the operation disabling signal has not been input, then the procedure transfers to step S33.

In step S32, the car navigation system 5 carries out processing to switch off an operation enabling flag which is stored in a RAM built into the car navigation system 5. When the processing in this step is completed, the procedure advances to step S34.

In step S33, the car navigation system 5 carries out processing to switch on the operation enabling flag. When the processing in this step is completed, the procedure advances to step S34.

In step S34, the car navigation system 5 determines whether or not an operation signal indicating that the touch panel display 51 has been operated is input from the touch panel display 51. When a touch panel display 51 has been operated, the procedure transfers to step S35, and if the touch panel display 51 has not been operated, then the equipment operation process terminates.

In step S35, the car navigation system 5 determines whether or not the operation enabling flag which is stored in the RAM built into the car navigation system 5 has been switched on. If the operation enabling flag is on, then the procedure transfers to step S36, and if the operation enabling flag is off, then the equipment operation process terminates.

In step S36, the car navigation system 5 performs functions in accordance with the operations made on the touch panel display 51. In other words, the car navigation system 5 performs navigation functions, such as setting a destination, and audio functions, such as selecting music and the like, in accordance with the operations performed on the touch panel display 51. When the processing in this step has been completed, the equipment operation control process terminates.

In the present implementation, when the touch panel display 51 is operated, the car navigation system 5 determines whether or not the operation enabling flag is on, and performs functions in accordance with these operations when the flag is on. But the present invention is not limited to this. For example, the sensory response power source of the touch panel display 51 may be switched off so that operations to the touch panel display 51 cannot be accepted, when the operation disabling signal is input to the car navigation system 5.

In this way, in principle, the vehicle-mounted equipment control device 8 implements control to disable the operation of the car navigation system 5. However, if the vehicle speed is less than a prescribed value, for example 10 km/h, then the vehicle-mounted equipment control device 8 implements control to enable the operation of the car navigation system 5. Moreover, even when the vehicle speed is equal to or greater than the prescribed value of 10 km/h, if the risk evaluator 9 has determined to permit operation of the vehicle-mounted equipment and if the travel assistance controller 10 is implementing control to assist the travel of the vehicle 1, then control is implemented to enable operation of the car navigation system 5. In other words, if the vehicle 1 is traveling at the prescribed value of 10 km/h or above, then the operation of the car navigation system 5 is enabled upon the condition that the risk to the vehicle 1 is determined to be equal to or less than a prescribed level, on the basis of the outside circumstances of the vehicle 1 and/or the state of the vehicle 1, and that control to assist the travel of the vehicle 1 is being implemented.

On the other hand, if the vehicle speed is equal to or greater than a prescribed value, for example, 10 km/h, and the risk evaluator 9 has determined not to permit the operation of the vehicle-mounted equipment, then processing is not carried out to enable the operation of the car navigation system 5. Moreover, even when the risk evaluator 9 has determined to permit operation of the vehicle-mounted equipment although the vehicle speed is equal to or greater than the prescribed value of 10 km/h, processing is not carried out to enable operation of the car navigation system 5 if the travel assistance controller 10 is not implementing control to assist the travel of the vehicle 1. Consequently, operation of the car navigation system 5 is not possible in cases where the vehicle speed is equal to or greater than a prescribed value of 10 km/h and the risk upon the determination of the circumstances of the vehicle 1 is "2" or above, or where the vehicle speed is equal to or greater than the prescribed value of 10 km/h and travel assistance is not being implemented by the travel assistance controller 10.

The car navigation system 5 may be controlled to display "Car navigation system currently operable" on the touch panel display 51, if the operation enabling flag is on. Furthermore, the car navigation system 5 may be controlled to display "Car navigation system currently inoperable" on the touch panel display 51, if the operation enabling flag is off. In this way, by notifying the driver whether or not the car navigation system 5 can be operated, it is possible to improve the convenience for the driver.

According to the vehicle control apparatus which is configured in this way, in principle, the vehicle-mounted equipment control device 8 implements control to disable the operation of the car navigation system 5. However, if the speed of the vehicle 1 is less than 10 km/h, then control is implemented to enable the operation of the car navigation system 5. Furthermore, even if the speed of the vehicle 1 is 10 km/h and more, when it is determined to permit the operation of the vehicle-mounted equipment, then control is implemented to enable the operation of the car navigation system 5, provided that travel assistance control is being implemented. Accordingly, it is possible to simultaneously guarantee the safety of travel of the vehicle 1 and to ensure the convenience of use of the car navigation system 5.

Furthermore, the risk evaluator 9 of the environment recognition device 7 determines the risk relating to the vehicle 1, on the basis of image data from outside the vehicle 1 which is captured by the imaging device 2, and data on the moment acting on the vehicle 1 and the steering angle of the vehicle 1 acquired by the vehicle state detection device 3. Therefore, it is possible to determine whether to permit operation of the car navigation system 5, on the basis of an accurately determined risk relating to the vehicle 1.

Furthermore, in principle, the vehicle-mounted equipment control device 8 implements control to disable the operation of the car navigation system 5, and only implements control to enable operation of the car navigation system 5 when prescribed conditions are established. Therefore, it is possible to further enhance safety.

In the present implementation, the vehicle-mounted equipment control device 8 implements control to disable or enable operation of the car navigation system 5, but the invention is not limited to this. Apart from the car navigation system 5, a plurality of other equipment (not illustrated) for purposes other than a driving operation for travel of the vehicle, such as an audio device, air-conditioning unit, etc. is provided at the driver seat, and the operation of this equipment during travel of the vehicle 1 may also be subjected to similar control to the car navigation system 5, by the vehicle-mounted equipment control device 8. Furthermore, in addition to the equipment mounted in the vehicle 1, the operation of portable telephones, portable televisions and the like, taken into the vehicle by the driver, for example, can also be controlled by the vehicle-mounted equipment control device 8.

Moreover, in the present implementation, the environment recognition device 7 recognizes the environment of the vehicle 1 by determining the outside circumstances of the vehicle 1, on the basis of the image data from outside the vehicle 1 captured by the imaging device 2. However, the invention is not limited to this; for example, the environment recognition device 7 may determine the outside circumstances of the vehicle 1 on the basis of data on the outside circumstances of the vehicle 1 acquired by another device, such as a radar using electromagnetic waves or a sonar using ultrasonic waves.

[Modification of First Implementation]

Figure 7:
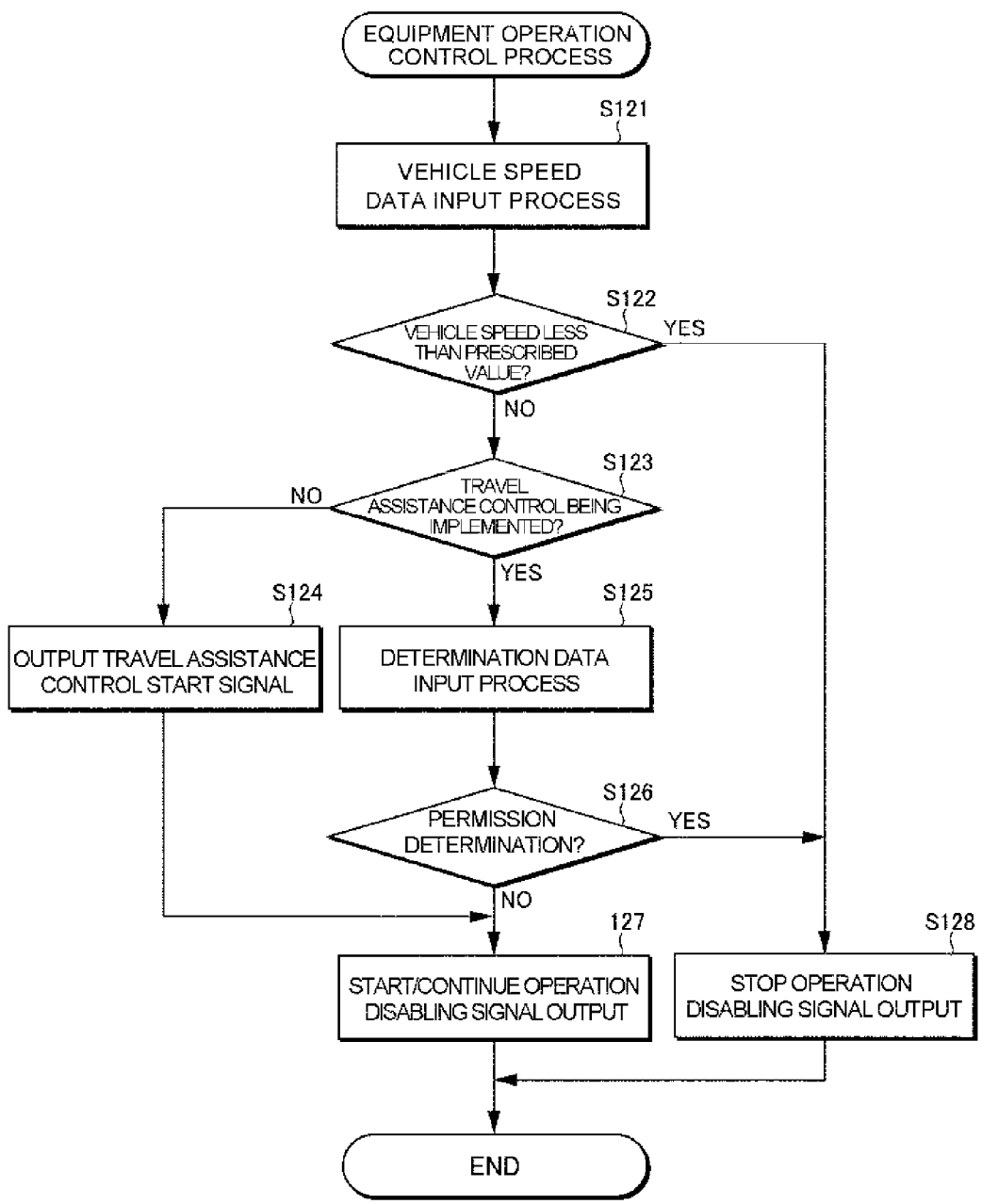
FIG. 7 is a diagram illustrating an equipment operation control process according to a modification.

Next, a modification of the process for controlling equipment operation by the vehicle-mounted equipment control device 8 will be described with reference to FIG. 7. Here, in the modification, it is possible to output a signal from the vehicle-mounted equipment control device 8 to the travel assistance controller 10. The portions which are the same as the implementation described above are labelled with the same reference numerals.

In step S121, the vehicle-mounted equipment control device 8 inputs vehicle speed data from the travel assistance controller 10.

In step S122, the vehicle-mounted equipment control device 8 determines whether or not the speed of the vehicle 1 is equal to or lower than a prescribed value. If the speed of the vehicle 1 is less than a prescribed value, for example, 10 km/h, then the procedure transfers to step S128, and if the speed is equal to or greater than 10 km/h, then the procedure transfer to step S123.

In step S123, the vehicle-mounted equipment control device 8 determines whether or not the travel assistance controller 10 is implementing control to assist the travel of the vehicle 1. If the travel assistance controller 10 is implementing control to assist the travel of the vehicle 1, then the procedure transfers to step S125 and if the travel assistance controller 10 is not implementing control to assist the travel of the vehicle 1, then the procedure transfers to step S124.

In step S124, the vehicle-mounted equipment control device 8 outputs a travel assistance control start signal to the travel assistance controller 10. Accordingly, the travel assistance controller 10 which has received the travel assistance control start signal starts control to assist the travel of the vehicle 1. When the processing in this step is completed, the procedure advances to step S127.

In step S125, the vehicle-mounted equipment control device 8 inputs determination data from the risk evaluator 9.

In step S126, the vehicle-mounted equipment control device 8 analyzes the determination data and determines whether or not the determination result from the risk evaluator 9 permits operation of the vehicle-mounted equipment. If the determination result from the risk evaluator 9 permits operation of the vehicle-mounted equipment, the procedure advances to S128, and if the determination result from the risk evaluator 9 does not permit operation of the vehicle-mounted equipment, then the procedure advances to step S127.

In step S127, the vehicle-mounted equipment control device 8 starts or continues the output of an operation disabling signal to the car navigation system 5. Consequently, the operation disabling signal continues to be output from the vehicle-mounted equipment control device 8 to the car navigation system 5. When the processing in this step has been completed, the equipment operation control process terminates.

In step S128, the vehicle-mounted equipment control device 8 stops the output of the operation disabling signal to the car navigation system 5. Consequently, the operation disabling signal ceases to be output from the vehicle-mounted equipment control device 8 to the car navigation system 5.

When the processing in this step has been completed, the equipment operation control process terminates.

In this way, in the modification, the vehicle-mounted equipment control device 8 implements control to start travel assistance of the vehicle 1 by the travel assistance controller 10, if it is determined that travel assistance for the vehicle 1 is not being implemented by the travel assistance controller 10. By implementing control to transfer to a state where operation of the equipment is possible in this way, the safety of the vehicle 1 during travel can be improved.

[Second Implementation]

Next, a vehicle 1 provided with a vehicle control apparatus relating to a second implementation of the present invention will be described.

The composition having functions which are the same as or similar to the first implementation are labelled with the same reference numerals as the first implementation and description thereof is omitted. The following description centers on the differences with respect to the first implementation.

If the risk evaluator 9 considers that the risk has not increased, then it is determined not to prohibit operation of the vehicle-mounted equipment. On the other hand, if it is considered that the risk has increased, then it determined to prohibit operation of the vehicle-mounted equipment.

The risk evaluator 9 may determine not to prohibit operation of the vehicle-mounted equipment if the integrated value of individual risks is equal to or less than a prescribed value, and may determine to prohibit operation of the vehicle-mounted equipment, if the integrated value is greater than the prescribed value. For example, even if the distance from the vehicle 1 to the preceding vehicle is not short, the integrated value of the risk becomes high when the moment acting on the vehicle 1 is strong, and hence it is determined to prohibit the operation of the vehicle-mounted equipment. The individual risks may also include the risk of injury to an occupant, based on the sitting position and attitude, etc., of the occupant, and so on.

Here, even if the individual risk values are calculated, the risk evaluator 9 does not have to determine whether or not to permit operation of the vehicle-mounted equipment on the basis of the integrated value of the individual risks, but rather may determine not to prohibit operation of the vehicle-mounted equipment on condition that all of the risk values are equal to or lower than a prescribed value, and determine to prohibit operation of the vehicle-mounted equipment if any one of the risk values is equal to or greater than the prescribed value. Furthermore, it is also possible to determine whether or not to permit operation of the vehicle-mounted equipment depending on whether or not the maximum value of the individual risk values, rather than the integrated value of the individual risks, is equal to or lower than a prescribed value.

Furthermore, the risk evaluator 9 may determine the circumstances of the vehicle 1 on the basis of only the image data acquired by the imaging device 2, or may determine the circumstances of the vehicle 1 on the basis of only the moment data and/or the steering angle data acquired by the vehicle state detection device 3. Moreover, in addition to the image data and/or the moment data, etc., the circumstances of the vehicle 1 may also be determined on the basis of the vehicle speed data acquired by the vehicle state detection device 3.

Furthermore, the risk evaluator 9 may set up a risk map indicating the distribution of the risk potential of the vehicle 1 on the basis of the image data acquired by the imaging device 2, and may determine whether or not to permit operation of the vehicle-mounted equipment on the basis of the set risk map. In this case, for example, a plurality of risk potential distributions based on the type of road and the type of obstacle, etc. situated about the periphery of the vehicle 1 are generated on the basis of image data, and a risk map is created by synthesizing these risk potentials. The risk is then evaluated on the basis of the created risk map, depending on whether or not the risk potential distributions have increased relatively, and whether or not the vehicle 1 is close to the risk potential. The risk evaluator 9 determines not to prohibit operation of the vehicle-mounted equipment if it is determined that the distribution of risk potentials has not increased relatively and the risk potential is not close to the vehicle 1. On the other hand, the risk evaluator 9 determines to permit operation of the vehicle-mounted equipment if it is determined that the distribution of risk potentials has increased relatively or if it is determined that the vehicle 1 is close to a risk potential.

Furthermore, the risk evaluator 9 may obtain a risk distribution on the basis of a characteristic amount of the image data acquired by the imaging device 2, and evaluate the risk to the vehicle 1 on the basis of this risk distribution. Here, the risk evaluated from the characteristic amount of the image data is, for instance, higher when an object in the periphery of the vehicle 1 detected by the image data is a vehicle rather than road infrastructure, and is even higher when the object is a pedestrian, rather than a vehicle. A risk distribution representing the level of risk is represented by contour lines. The risk evaluator 9 refers to the risk distribution and determines not to prohibit operation of the vehicle-mounted equipment if it is evaluated, on the basis of the state of the vehicle 1 and the like, that the peaks of the contour lines are not high and the vehicle 1 is not close to a peak of the contour lines. On the other hand, if it is evaluated that the peak of the contour line is high, or that the vehicle is close to the peak of a contour line, then it is determined to prohibit operation of the vehicle-mounted equipment.

Moreover, the risk evaluator 9 may evaluate the risk to the vehicle 1 by estimating the inner state of the driver. In this case, for example, the risk evaluator 9 creates a model parameter by learning from the image data acquired by the imaging device 2 and driving operation data for the driver. This model parameter is used to acquire a relationship between the travel environment risk level and an operation characteristic amount of the driver, and to estimate the current inner state of the driver. The estimated inner state of the driver and the travel environment risk are compared to evaluate the risk to the vehicle 1. If it is evaluated that the vehicle 1 is in a substantially safe state and is not approaching a dangerous state, then it is determined not to prohibit operation of the vehicle-mounted equipment. On the other hand, if it is evaluated that the vehicle 1 is in a substantially dangerous state or approaching a dangerous state, then it is determined to prohibit operation of the vehicle-mounted equipment.

In this way, the risk evaluator 9 of the environment recognition device 7 evaluates the risk to the vehicle 1 by converting the risk into a parameter by calculation based on the recognized environment of the vehicle 1, assessing the risk potential, and creating a risk map, and evaluates whether or not the recognized environment of the vehicle 1 satisfies prescribed conditions.

The risk evaluator 9 and the travel assistance controller 10 both implement control on the basis of the risk relating to the vehicle 1, and the risk evaluated by the risk evaluator 9 and the risk used by the travel assistance controller 10 may be the same or different. Desirably, the risk evaluator 9 predictively evaluates the risk which may occur during operation of the vehicle-mounted equipment by an occupant, and the travel assistance controller 10 evaluates the actually occurring risk relating to the vehicle 1 which is to be avoided. For example, if the distance between the vehicle 1 and the object is 100 m, then the risk evaluator 9 considers that the risk is equal to or less than the prescribed level and determines not to prohibit operation of the vehicle-mounted equipment, whereas the travel assistance controller 10 may consider that the obstacle is a risk that is to be avoided and may implement control to adjust the drive amount and/or steering amount of the vehicle 1. Furthermore, if the vehicle 1 is reversing and there is no obstacle in the direction of rearward travel, then the risk evaluator 9 may consider that the risk is equal to or greater than the prescribed level and determine to prohibit operation of the vehicle-mounted equipment, whereas the travel assistance controller 10 may determine that there is no risk to be avoided.

The vehicle-mounted equipment control device 8, which is an equipment operation controller, implements control to enable or disable the operation of the car navigation system 5. More specifically, the vehicle-mounted equipment control device 8 implements control whereby, when an operation is made to the car navigation system 5, the car navigation system 5 functions in accordance with this operation. Although a more detailed description is given below, if a prescribed condition is established, for instance, if the speed of travel of the vehicle 1 is equal to or greater than a prescribed value, then control is implemented to disable the operation of the car navigation system 5.

Figure 8:
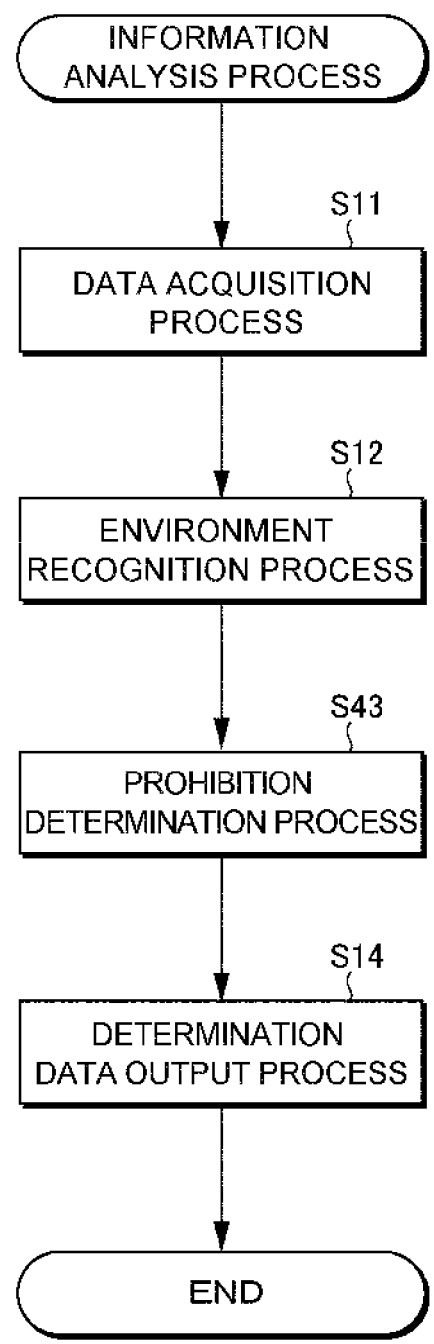
FIG. 8 is a diagram illustrating an information analysis process according to a second implementation of the present invention.

Next, an information analysis process which is carried out by the environment recognition device 7 to recognize the environment of the vehicle 1 on the basis of the outside circumstances of the vehicle 1 and the state of the vehicle 1, and to determine whether or not to permit operation of the vehicle-mounted equipment on the basis of the recognized environment of the vehicle 1, will be described with reference to FIG. 8. The processing flow illustrated in FIG. 8 is executed at prescribed intervals apart (every 4 milliseconds, for example).

Firstly, in step S11, the environment recognition device 7 inputs the image data acquired by the imaging device 2 and the moment data and steering angle data acquired by the vehicle state detection device 3.

In step S12, the environment recognition device 7 recognizes the environment of the vehicle 1 on the basis of the image data, the moment data and the steering angle data input in step S11. More specifically, the environment recognition device 7 recognizes the environment of the vehicle 1, on the basis of whether or not there is an obstacle, or the like, present in the direction of travel of the vehicle 1, the distance from the vehicle 1 to the obstacle, and the moment acting on the vehicle 1 and the steering angle of the vehicle 1.

In step S43, the risk evaluator 9 of the environment recognition device 7 determines whether or not to permit operation of the vehicle-mounted equipment, on the basis of the environment of the vehicle 1 recognized in step S12. In other words, the risk evaluator 9 determines not to prohibit operation of the vehicle-mounted equipment, when the environment of the vehicle 1 satisfies prescribed conditions, and determines to prohibit operation of the vehicle-mounted equipment, when the environment of the vehicle 1 does not satisfy prescribed conditions. For example, if there is no other vehicle, pedestrian, obstacle, or the like, situated outside the vehicle 1, then it is readily determined that the environment of the vehicle 1 satisfies the prescribed conditions. Furthermore, if there is another vehicle, pedestrian, obstacle, or the like, present outside the vehicle 1, then it can be more readily determined that the environment of the vehicle 1 does not satisfy the prescribed conditions, the shorter the distance to the vehicle 1 from the other vehicle, pedestrian or obstacle, or the like. Moreover, when a large moment is acting on the vehicle 1 or the steering angle of the vehicle 1 indicates turning, then it can be determined readily that the environment of the vehicle 1 does not satisfy the prescribed conditions.

In step S14, the risk evaluator 9 of the environment recognition device 7 outputs determination data corresponding to the determination result in step S43, to the vehicle-mounted equipment control device 8. When this processing is completed, the information analysis process terminates.

Figure 9:
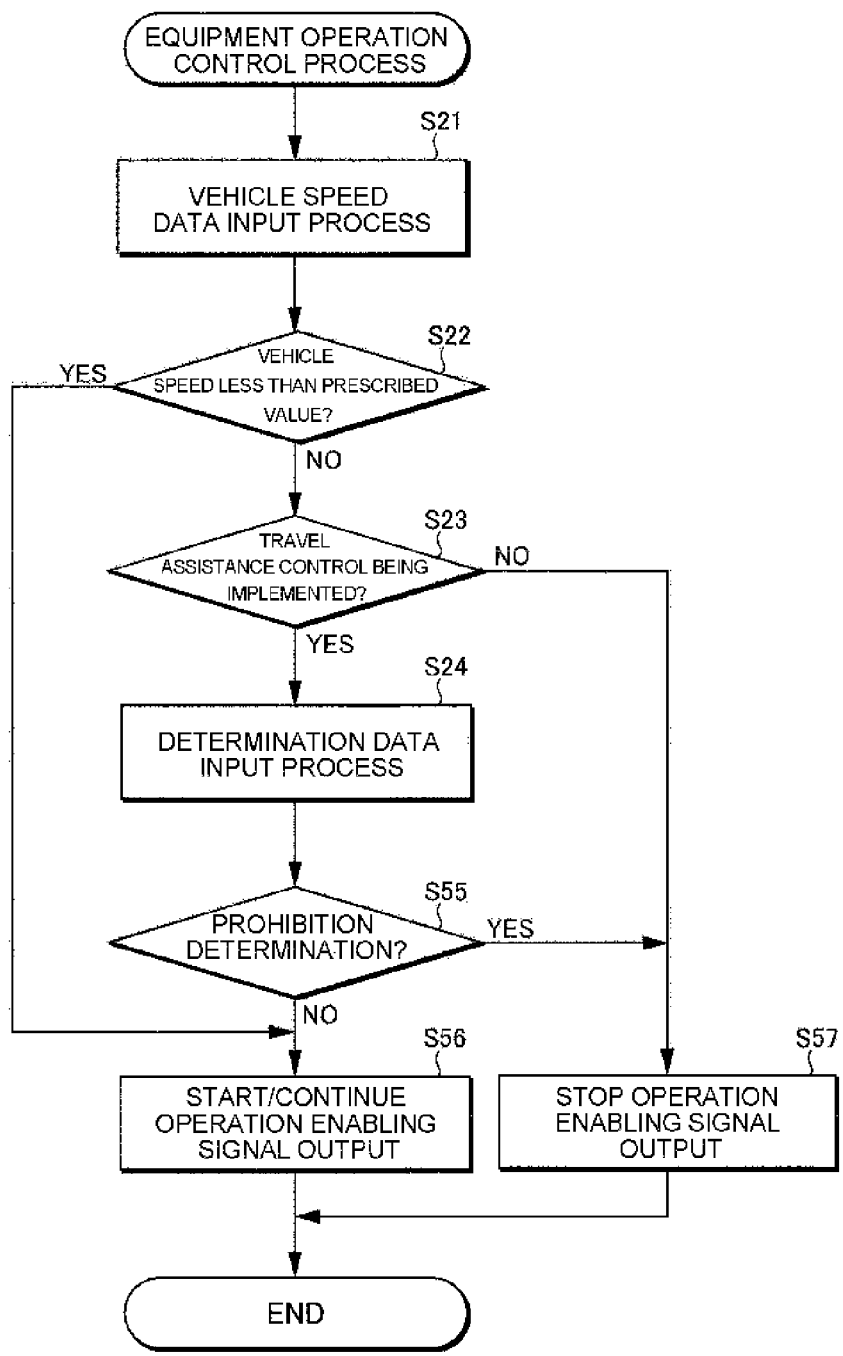
FIG. 9 is a diagram illustrating an equipment operation control process.

Next, the process of controlling operation of the car navigation system 5 by the vehicle-mounted equipment control device 8 will be described with reference to FIG. 5. The processing flow illustrated in FIG. 9 is executed at prescribed intervals apart (every 4 milliseconds, for example).

The vehicle-mounted equipment control device 8 controls the output of an operation disabling signal to the car navigation system 5. In principle, the vehicle-mounted equipment control device 8 outputs an operation enabling signal to the car navigation system 5 at all times, in step S56 described below.

Firstly, in step S21, the vehicle-mounted equipment control device 8 inputs vehicle speed data from the travel assistance controller 10. Here, the vehicle-mounted equipment controller 8 may input vehicle speed data directly from the vehicle state detection device 3.

In step S22, the vehicle-mounted equipment control device 8 determines whether or not the vehicle speed of the vehicle 1 is equal to or lower than a prescribed value. More specifically, the vehicle-mounted equipment control device 8 analyzes the vehicle speed data input in step S21, and determines whether or not the vehicle 1 is stationary or is traveling at a prescribed speed, for example, less than 10 km/h. If the speed of the vehicle 1 is less than the prescribed value of 10 km/h, then the procedure transfers to step S56, and if the speed is equal to or greater than 10 km/h, then the procedure transfers to step S23.

In step S23, the vehicle-mounted equipment control device 8 determines whether or not the travel assistance controller 10 is implementing control to assist the travel of the vehicle 1. If the travel assistance controller 10 is implementing control to assist the travel of the vehicle 1, then the procedure transfers to step S24, and if the travel assistance controller 10 is not implementing control to assist the travel of the vehicle 1, then the procedure transfers to step S57.

In step S24, the vehicle-mounted equipment control device 8 inputs determination data from the risk evaluator 9 of the environment recognition device 7. Consequently, the vehicle-mounted equipment control device 8 acquires the determination result data obtained as a result the risk evaluator 9 of the environment recognition device 7 determining whether or not to permit operation of the vehicle-mounted equipment, in the step 43.

In step S55, the vehicle-mounted equipment control device 8 analyzes the determination data acquired in step S24 and determines whether or not the determination result from the risk evaluator 9 prohibits operation of the vehicle-mounted equipment. If the determination result from the risk evaluator 9 prohibits operation of the vehicle-mounted equipment, the procedure advances to S57, and if the determination result from the risk evaluator 9 does not prohibit operation of the vehicle-mounted equipment, then the procedure advances to step S56.

In step S56, the vehicle-mounted equipment control device 8 starts or continues the output of an operation enabling signal to the car navigation system 5. Consequently, the output of an operation enabling signal from the vehicle-mounted equipment control device 8 to the car navigation system 5 is started, and if the operation enabling signal is already being output, then the output of the operation enabling signal is continued. When the processing in this step has been completed, the equipment operation control process terminates.

In step S57, the vehicle-mounted equipment control device 8 stops the output of the operation enabling signal to the car navigation system 5. Consequently, the operation enabling signal ceases to be output from the vehicle-mounted equipment control device 8 to the car navigation system 5. When the processing in this step has been completed, the equipment operation control process terminates.

Figure 10:
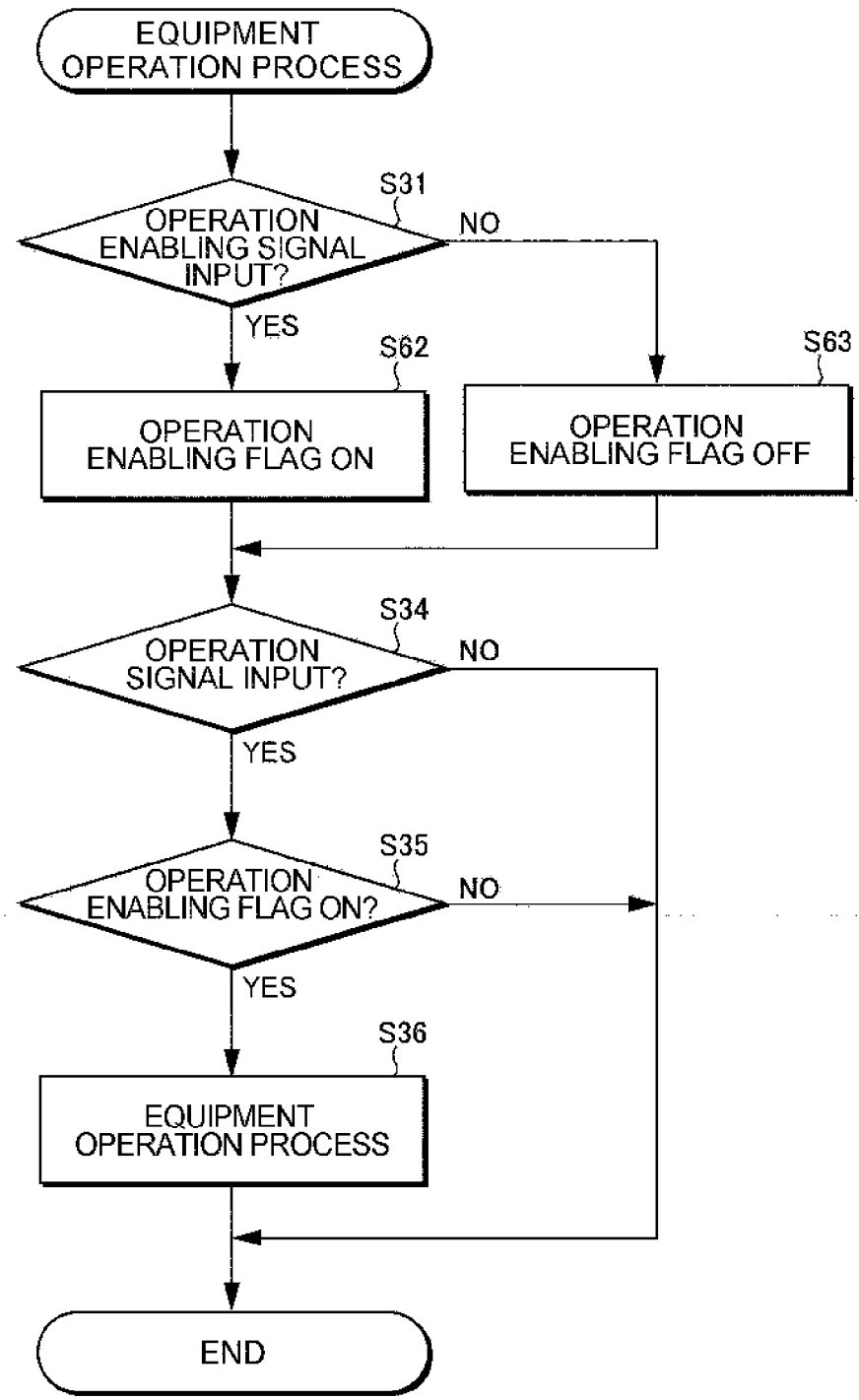
FIG. 10 is a diagram illustrating an equipment operation process.

Next, the equipment operation process for the car navigation system 5 will be described with reference to FIG. 10. The processing flow illustrated in FIG. 10 is executed at prescribed intervals apart (every 4 milliseconds, for example).

Firstly, in step S31, the car navigation system 5 determines whether or not an operation enabling signal has been input from the vehicle-mounted equipment control device 8. If an operation enabling signal has been input, then the procedure transfers to step S62, and if the operation enabling signal has not been input, then the procedure transfers to step S63.

In step S62, the car navigation system 5 carries out processing to switch on an operation enabling flag which is stored in a RAM built into the car navigation system 5. When the processing in this step is completed, the procedure advances to step S34.

In step S63, the car navigation system 5 carries out processing to switch off the operation enabling flag. When the processing in this step is completed, the procedure advances to step S34.

Thereafter, the flow of processing from step S34 to step S36 is similar to that of the first implementation.

In this way, in principle, the vehicle-mounted equipment control device 8 implements control to enable the operation of the car navigation system 5. In other words, when the vehicle speed is less than a prescribed value, for example 10 km/h, then the vehicle-mounted equipment control device 8 implements control to keep the operation of the car navigation system 5 enabled. Moreover, even when the vehicle speed is equal to or greater than the prescribed value of 10 km/h, if the risk evaluator 9 has not determined to prohibit operation of the vehicle-mounted equipment, and if the travel assistance controller 10 is implementing control to assist the travel of the vehicle 1, then control is implemented to keep operation of the car navigation system 5 enabled.

However, regardless of the foregoing, when prescribed conditions are established, control is implemented to disable operation of the car navigation system 5. In other words, when the vehicle speed is equal to or greater than the prescribed value of 10 km/h, for example, and the risk evaluator 9 has determined to prohibit operation of the vehicle-mounted equipment, then control is implemented to disable operation of the car navigation system 5, even if the travel assistance controller 10 is implementing control to assist the travel of the vehicle 1. Furthermore, when the vehicle speed is equal to or greater than the prescribed value of 10 km/h, even if the risk evaluator 9 has not determined to prohibit operation of the vehicle-mounted equipment, control is implemented to disable operation of the car navigation system 5, if the travel assistance controller 10 is not implementing control to assist the travel of the vehicle 1. Consequently, operation of the car navigation system 5 is not possible, exceptionally, when the vehicle speed is equal to or greater than the prescribed value and the risk evaluator 9 has determined to prohibit operation of the vehicle-mounted equipment, and when the vehicle speed is equal to or greater than the prescribed value and the travel assistance controller 10 is not implementing travel assistance.

According to the vehicle control apparatus which is configured in this way, in principle, the vehicle-mounted equipment control device 8 determines between enabling and disabling control, and in principle implements control to enable the operation of the car navigation system 5. For instance, if the risk evaluator 9 has determined to prohibit operation of the vehicle-mounted equipment, then control is implemented to disable operation of the car navigation system 5, even if the travel assistance controller 10 is implementing control to assist travel. Accordingly, it is possible to simultaneously guarantee the safety of travel of the vehicle 1 and to ensure the convenience of use of the car navigation system 5.

Furthermore, the risk evaluator 9 of the environment recognition device 7 recognizes the environment of the vehicle 1 and evaluates the risk, on the basis of image data from outside the vehicle 1 which is captured by the imaging device 2, and data on the moment acting on the vehicle 1 and the steering angle of the vehicle 1 acquired by the vehicle state detection device 3. Therefore, it is possible to determine whether or not to prohibit operation of the car navigation system 5, on the basis of an accurately evaluated risk relating to the vehicle 1.

Furthermore, even if the risk evaluator 9 has determined not to prohibit operation of the vehicle-mounted equipment when the vehicle speed is equal to or greater than 10 km/h, the vehicle-mounted equipment control device 8 implements control to disable operation of the car navigation system 5 in cases where the travel assistance controller 10 is not implementing control for travel assistance. Therefore, it is possible to further enhance safety.

In the present implementation, needless to say, similar variations to those of the first implementation are possible.

[Third Implementation]

The first implementation described above is an example in which the vehicle-mounted equipment control device 8, in principle, enables operation of the car navigation system 5 and implements control to disable operation when an operation disabling signal is output. Furthermore, the second implementation described above is an example in which the vehicle-mounted equipment control device 8, in principle, disables operation of the car navigation system 5 and implements control to enable operation when an operation enabling signal is output. It is also possible to combine these implementations appropriately.

Here, in a third implementation, operation of the car navigation system 5 is enabled, in principle, and operation is disabled by a control disabling signal, and furthermore, operation is enabled by outputting a control enabling signal which enables operation, during the outputting of the control disabling signal.

Figure 11:
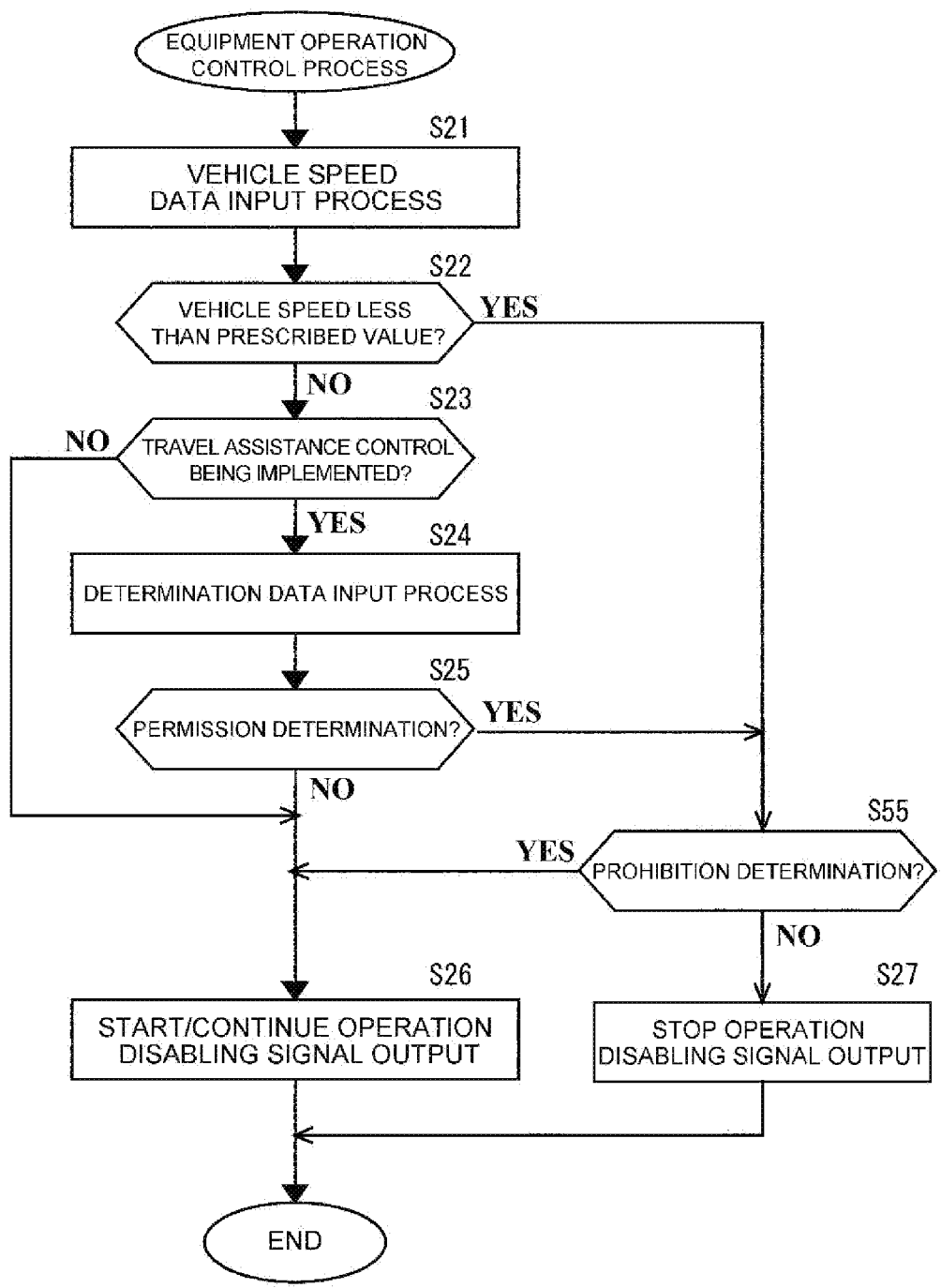
FIG. 11 is a diagram illustrating an equipment operation control process according to a third implementation of the present invention.

FIG. 11 is a diagram illustrating an equipment operation control process according to the third implementation of the present invention. The processing flow illustrated in FIG. 11 is executed at prescribed intervals apart (every 4 milliseconds, for example).

The vehicle-mounted equipment control device 8 controls the output of the operation disabling signal and the operation enabling signal to the car navigation system 5. In principle, the vehicle-mounted equipment control device 8 outputs an operation disabling signal to the car navigation system 5 at all times, in step S26 described below. Furthermore, in step S27, the operation enabling signal is output temporarily to the car navigation system 5.

In FIG. 11, step S21 to S27 are similar to FIG. 5.

After determining to permit operation in step S25, for example, the vehicle-mounted equipment control device 8, in step S55, analyzes the determination data acquired in step S24 and determines whether or not the determination result from the risk evaluator 9 temporarily prohibits operation of the vehicle-mounted equipment. If the determination result from risk evaluator 9 can temporarily prohibit the operation of the vehicle-mounted equipment, then the procedure transfers to step S26. In other cases, the vehicle-mounted equipment controller 8 transfers to the processing in step S27, in accordance with the permission determination result in step S25.

In this way, in the present implementation, even if it is determined in step S25 to grant temporary permission, a prohibition (starting or continuing to output the operation disabling signal) is implemented in accordance with the determination made in step S55. As a result of this, even if it is determined that operation of the car navigation system 5 can be permitted in general, it is possible to not permit such operation under special circumstances. Even if assistance is being provided by the travel assistance controller 10 and it is determined to grant temporary permission, the operation of the car navigation system 5 can be disabled during travel of the vehicle 1. Thus, advanced control of the prohibition and release of operation can be achieved.

According to the present invention, even while the vehicle is traveling, operation of equipment is made possible on the basis of outside information during assisted travel, and therefore it is possible to achieve both safety and convenience of use of the vehicle-mounted equipment.

Furthermore, if it is determined to prohibit equipment operation, and hence equipment operation is disabled even during assisted travel, then the equipment cannot be operated even during assisted travel, and therefore it is further possible to achieve both safety and convenience of use of the vehicle-mounted equipment.

As an example, these implementations have been described for a car navigation system. However, the object of the present invention is not limited to the car navigation system, and it is applicable to all devices not directly related to the maneuver of the vehicle such as a car radio, a car entertainment system, a car PC etc.

The invention claimed is:

1. A vehicle control apparatus, comprising:
   an outside information acquisition unit which acquires information on the outside of a vehicle;
   a determination unit which determines whether to permit an operation of an equipment that is operated inside a vehicle cabin, on the basis of the information acquired by the outside information acquisition unit;
   a travel assistance unit which assists travel of the vehicle via at least one of: controlling engine power, controlling braking, controlling steering, providing a visual notification, providing an audio notification, and providing a mechanical notification, on the basis of the information acquired by the outside information acquisition unit; and
   an equipment operation controller which enables the operation of the equipment that is operated inside the vehicle cabin while the vehicle is traveling, if travel is assisted by the travel assistance unit and the determination unit has determined to permit the operation of the equipment.

2. The vehicle control apparatus according to claim 1, wherein the determination unit determines whether to permit the operation of the equipment on the basis of a state of the vehicle, as well as the information acquired by the outside information acquisition unit.

3. The vehicle control apparatus according to claim 2, wherein the equipment operation controller disables the operation of the equipment during travel of the vehicle that is assisted by the travel assistance unit, except for cases where the determination unit determines to permit the operation of the equipment.

4. The vehicle control apparatus according to claim 2, wherein the travel assistance unit starts assistance of the travel of the vehicle, when the determination unit has determined to permit the operation of the equipment.

5. The vehicle control apparatus according to claim 2, wherein the determination unit determines whether to prohibit the operation of equipment that is operated inside the vehicle cabin, on the basis of the information acquired by the outside information acquisition unit, and the equipment operation controller disables the operation of the equipment while the vehicle is traveling, even during assistance by the travel assistance unit, when the determination unit has determined to prohibit the operation of the equipment.

6. The vehicle control apparatus according to claim 5, wherein the determination unit determines to prohibit the operation of the equipment on the basis of a state of the vehicle, as well as the information acquired by the outside information acquisition unit.

7. The vehicle control apparatus according to claim 6, wherein the equipment operation controller disables the operation of the equipment while the vehicle is traveling, when travel assistance is not being implemented by the travel assistance unit.

8. The vehicle control apparatus according to claim 5, wherein the equipment operation controller disables the operation of the equipment while the vehicle is traveling, when travel assistance is not being implemented by the travel assistance unit.

9. The vehicle control apparatus according to claim 1, wherein the equipment operation controller disables the operation of the equipment during travel of the vehicle that is assisted by the travel assistance unit, except for cases where the determination unit determines to permit the operation of the equipment.

10. The vehicle control apparatus according to claim 1, wherein the travel assistance unit starts assistance of the travel of the vehicle, when the determination unit has determined to permit the operation of the equipment.

11. The vehicle control apparatus according to claim 1, wherein the determination unit determines whether to prohibit the operation of equipment that is operated inside the vehicle cabin, on the basis of the information acquired by the outside information acquisition unit, and the equipment operation controller disables the operation of the equipment while the vehicle is traveling, even during assistance by the travel assistance unit, when the determination unit has determined to prohibit the operation of the equipment.

12. The vehicle control apparatus according to claim 11, wherein the determination unit determines to prohibit the operation of the equipment on the basis of a state of the vehicle, as well as the information acquired by the outside information acquisition unit.

13. The vehicle control apparatus according to claim 12, wherein the equipment operation controller disables the operation of the equipment while the vehicle is traveling, when travel assistance is not being implemented by the travel assistance unit.

14. The vehicle control apparatus according to claim 11, wherein the equipment operation controller disables the operation of the equipment while the vehicle is traveling, when travel assistance is not being implemented by the travel assistance unit.

* * * * *